United States Patent [19]
Abe

[11] Patent Number: 6,005,982
[45] Date of Patent: Dec. 21, 1999

[54] IMAGE COMPRESSION AND EXPANSION DEVICE

[75] Inventor: Nobuaki Abe, Hokkaido, Japan

[73] Assignee: Asahi Kogaku Kogyo Kabushiki Kaisha, Tokyo, Japan

[21] Appl. No.: 08/919,340

[22] Filed: Aug. 28, 1997

[30] Foreign Application Priority Data

Aug. 29, 1996 [JP] Japan .................. P08-247256

[51] Int. Cl.⁶ .................. H04N 1/41; H04N 1/46
[52] U.S. Cl. .................. 382/251; 358/426; 358/430; 358/539; 382/232; 382/248
[58] Field of Search .................. 382/232, 239, 382/248, 250, 251; 358/426, 432, 433, 261.2, 26.3, 430, 539; 348/403, 404, 405

[56] References Cited

U.S. PATENT DOCUMENTS

| | | | |
|---|---|---|---|
| 5,384,849 | 1/1995 | Jeong | 358/433 |
| 5,396,567 | 3/1995 | Jass | 358/433 |
| 5,410,351 | 4/1995 | Kojima | 348/405 |
| 5,412,484 | 5/1995 | Yoshikawa | 358/433 |
| 5,497,246 | 3/1996 | Abe | 358/426 |
| 5,666,209 | 9/1997 | Abe | 386/109 |
| 5,708,509 | 1/1998 | Abe | 358/426 |
| 5,850,484 | 12/1998 | Beretta et al. | 358/432 |

FOREIGN PATENT DOCUMENTS 7135568  11/1994  Japan.

*Primary Examiner*—Thomas D. Lee
*Attorney, Agent, or Firm*—Greenblum & Bernstein, P.L.C.

[57] ABSTRACT

The image compression device comprises: a DCT processing unit in which original image data is subjected to a two-dimensional discrete cosine transformation to obtain DCT coefficients; and a quantization processing unit in which the DCT coefficients are quantized by a default quantization table to obtain quantized DCT coefficients. In an optimum quantization table generation unit, an optimum quantization table is generated in such a manner that a quantization error between each of the DCT coefficients and each of the corresponding dequantized DCT coefficients, which are obtained by dequantizing each of the quantized DCT coefficients using the optimum quantization table, becomes a minimum value. The quantized DCT coefficients are compressed to obtain compressed image data, which is stored in a recording medium, together with the default quantization table and the optimum quantization table.

12 Claims, 13 Drawing Sheets

FIG. 8

| $r_{uv}$ | Q=12<br>$S_{uv}$ | Q'=11<br>$S'_{uv}$ |
|---|---|---|
| 0 | −5 ~ 5 | −5 ~ 5 |
| −1,1 | −17 ~ −6 , 6 ~ 17 | −16 ~ −6 , 6 ~ 16 |
| −2,2 | −29 ~ −18 , 18 ~ 29 | −27 ~ −17 , 17 ~ 27 |
| −3,3 | −41 ~ −30 , 30 ~ 41 | −38 ~ −28 , 28 ~ 38 |
| −4,4 | −53 ~ −42 , 42 ~ 53 | −49 ~ −39 , 39 ~ 49 |
| −5,5 | −65 ~ −54 , 54 ~ 65 | −60 ~ −50 , 50 ~ 60 |
| −6,6 | −77 ~ −66 , 66 ~ 77 | −71 ~ −61 , 61 ~ 71 |
| −7,7 | −89 ~ −78 , 78 ~ 89 | −82 ~ −72 , 72 ~ 82 |
| −8,8 | −101 ~ −90 , 90 ~ 101 | −93 ~ −83 , 83 ~ 93 |

FIG. 9

| $r_{uv}$ | DEQUANT. DCT COEF. $S'_{uv}$ | |
|---|---|---|
| 0 | 0 | (0 × 11) |
| 1 | 11 | (1 × 11) |
| 2 | 22 | (2 × 11) |
| 3 | 33 | (3 × 11) |
| 4 | 44 | (4 × 11) |
| 5 | 55 | (5 × 11) |
| 6 | 66 | (6 × 11) |
| ⑦ | 77 | (7 × 11) |
| ⑧ | 88 | (8 × 11) |
| ⑨ | 99 | (9 × 11) |

IMAGE COMPRESSION AND EXPANSION DEVICE

BACKGROUND OF THE INVENTION

1. Field of the Invention

The present invention is related to a device which compresses still image data in accordance with a JPEG (Joint Photographic Expert Group) algorithm and records the compressed image data in a recording medium and, also, to a device which reads the compressed image data from the recording medium and expands the compressed image data to reproduce the still image.

2. Description of the Related Art

Image data contains a large amount of information. Accordingly, if the image data is directly processed, a large capacity memory and protracted data transfer time is required. Thus, conventionally, the image data is, first, decoded, so that the image data can be compressed, and is then processed.

A standard algorithm, for the encoding of high resolution images and the transfer of that information through telecommunication transmission channels, has been recommended by the JPEG. In order to enable a large-scale data compression, the baseline process of the JPEG algorithm breaks down the original image data into components on a spatial frequency axis using a two-dimensional discrete cosine transformation (two-dimensional DCT) process. Thereafter, the data expressed on the spatial frequency axis is quantized by using a quantization table. The quantized data is then encoded using a Huffman table.

By performing such a data compression, part of the information of the original image is lost. Namely, the image quality of the reproduced image may be deteriorated in comparison with the original image. If the value of each of the quantization coefficients included in the quantization table is set to have a smaller value, the values of the quantized DCT coefficients become large. This improves the quality of the reproduced image, but the amount of the compressed data is increased. Conversely, it is possible that, by estimating the quality of the reproduced image, the values of the quantization coefficients can be altered so as to obtain a sufficiently high quality image. The data compression is then performed again, but such an operation needs a lengthy time to process the image data, and thus, the operation efficiency is low.

Japanese Unexamined Patent Publication No. 7-135568 (corresponding to U.S. Ser. No. 08/337,409) discloses an image compression device, in which second quantization coefficients are obtained in such a manner that a quantization error, i.e., a difference between a DCT coefficient and a corresponding dequantized DCT coefficient, becomes a minimum. Thus, an optimum quantization table composed entirely of second quantization coefficients is generated, which is then recorded in a recording medium together with the compressed image data.

However, the optimum quantization table, by using minimum value quantization errors which relate to one image as a whole, is not necessarily the optimum regarding each block of pixels which, together, form the one image, even though the quantization error has a minimum value with respect to the one image as a whole. Therefore, in the expansion process using the optimum quantization table, the improvement of the quality of the reproduced image is limited to some extent. Therefore, it is desired that the image quality is further improved.

SUMMARY OF THE INVENTION

Accordingly, an object of the present invention is to provide an image compression device in which the optimum quantization table is efficiently utilized, so that an image of a higher quality than that obtained from a conventional device can be reproduced.

According to the present invention, there is provided an image compression device comprising a quantization processor, a quantization table generating processor, a compression processor and a quantization table storing processor.

The quantization processor quantizes image-processed data regarding one image, using a first quantization table composed of a plurality of first quantization coefficients, to obtain quantized image-processed coefficients. The quantization table generating processor generates a second quantization table composed of a plurality of second quantization coefficients in such a manner that dequantized image-processed coefficients, which are obtained by dequantizing the quantized imaqe-prooosed coefficients by using the second quantization table, have values close to the image-processed data for the one image as a whole The compression processor compresses the quantized image-processed coefficients to obtain compressed image data, and stores the compressed image data in a recording medium. The quantization table storing processor stores the first and second quantization tables in the recording medium.

Further, according to the present invention, there is provided an image compression device in which input corresponding to one image, is divided into a plurality of blocks, which are then compressed. The device comprises a transformation processor, a quantization processor, a quantization table operating processor, a compression processor and a quantization table storing processor.

The transformation processor performs a two-dimensional discrete cosine transformation (two-dimensional DCT) on the input data to obtain DCT coefficients. The quantization processor quantizes the DCT coefficients, using a first quantization table composed of a plurality of first quantization coefficients, to obtain quantized DCT coefficients. The quantization table generating processor generates a second quantization table composed of a plurality of second quantization coefficients, in such a manner that dequantized DCT coefficients, which are obtained by dequantizing the quantized DCT coefficients using the second quantization table, have values close to the DCT coefficients for the one image as a whole. The compression processor compresses the quantized DCT coefficients to obtain compressed image data, and stores the compressed image data in a recording medium. The quantization table storing processor also stores the first and second quantization tables in the recording medium.

Another object of the present invention is to provide an image expansion device by which compressed image data, obtained by the image compression device, can be expanded.

According to the present invention, there is provided an image expansion device by which compressed image data recorded in a recording medium, in which a first quantization table composed of a plurality of first quantization coefficients and a second quantization table composed of a plurality of second quantization coefficients are stored, is expanded. The device comprises an expansion processor and a dequantization processor.

The expansion processor expands the compressed image data, read from the recording medium, to reproduce quantized image-processed coefficients. The dequantization processor selects one of the first or second quantization tables, in accordance with values of the quantized image-processed coefficients, and dequantizes the quantized image-processed coefficients, using the selected quantization table, to obtain dequantized image-processed coefficients.

Further, according to the present invention, there is provided an image expansion device by which compressed image data recorded in a recording medium, in which also a first quantization table composed of a plurality of first quantization coefficients and a second quantization table composed of a plurality of second quantization coefficients are stored, is expanded. The device comprises an expansion processor and a dequantization processor.

The expansion processor expands the compressed image data, read from the recording medium, to reproduce quantized DCT coefficients. The dequantization processor selects one of the first and second quantization tables in accordance with values of the quantized DCT coefficients, and dequantizes the quantized DCT coefficients, using the selected quantization table, to obtain dequantized DCT coefficients.

BRIEF DESCRIPTION OF THE DRAWINGS

The present invention will be better understood from the description of the preferred embodiments of the invention set forth below, together with the accompanying drawings, in which:

FIG. 8 is a view showing a relationship between the quantized DCT coefficients $r_{uv}$ and the DCT coefficients $S_{uv}$ when the quantization coefficients $Q_{uv}$ included in the quantization table are 12 and 11, respectively;

FIG. 9 is a view showing a relationship between the quantized DCT coefficient $r_{uv}$ and the dequantized DCT coefficient $S'_{uv}$ obtained by dequantizing the quantized DCT coefficient $r_{uv}$ by the quantization coefficient $Q_{uv}=11$;

DESCRIPTION OF THE PREFERRED EMBODIMENTS

Figure 1:
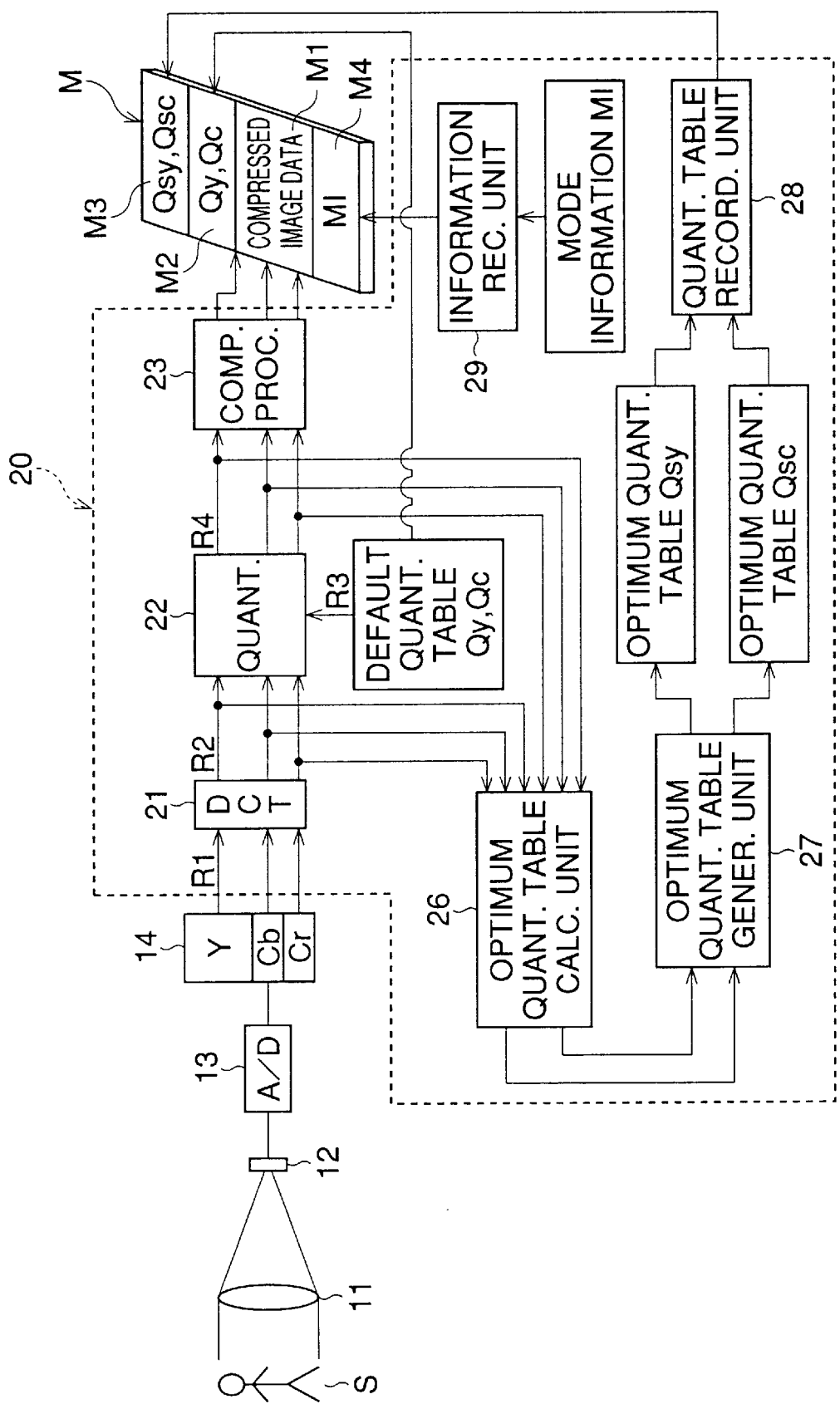
FIG. 1 is a block diagram showing an image compression device of a first embodiment of the present invention.

The present invention will be described below with reference to embodiments shown in the drawings.

FIG. 1 is a block diagram of an image compression device of a first embodiment of the present invention, by which luminance data and color difference data, which correspond to an original still image, are compressed according to the JPEG algorithm.

Light reflected from a subject S passes through an imaging optical system 11 such that the reflected light is focused on a CCD (charge coupled device) 12. Multiple photoelectric conversion elements are provided on the light receiving surface of the CCD 12. A color filter element (not shown) of red, green or blue is placed on each photoelectric conversion element, which corresponds to one pixel. Thus, the CCD 12 produces charges, which are representative of the quantity of light incident thereon, and outputs an analog pixel signal to an A/D converter 13.

The A/D converter 13 converts the analog pixel signal to a digital pixel signal which is inputted to a signal processing unit (not shown). The signal processing unit converts the pixel signals into luminance data Y and color difference data Cb and Cr, which are stored in an image memory 14. The image memory 14 is divided into a plurality of memory areas, which are independent from each other, each of which has a capacity of one frame's worth of image data. The luminance data Y and the color difference data Cb and Cr, stored in the image memory 14, are inputted to a DCT processing unit 21 included in an image compression device 20, so that a data compression process is performed on the signals Y, Cb and Cr. Note that, although a single DCT processing unit 21 is shown in FIG. 1, actually, a DCT processing unit is independently provided for the luminance data Y and the color difference data Cb and Cr.

Figure 2:
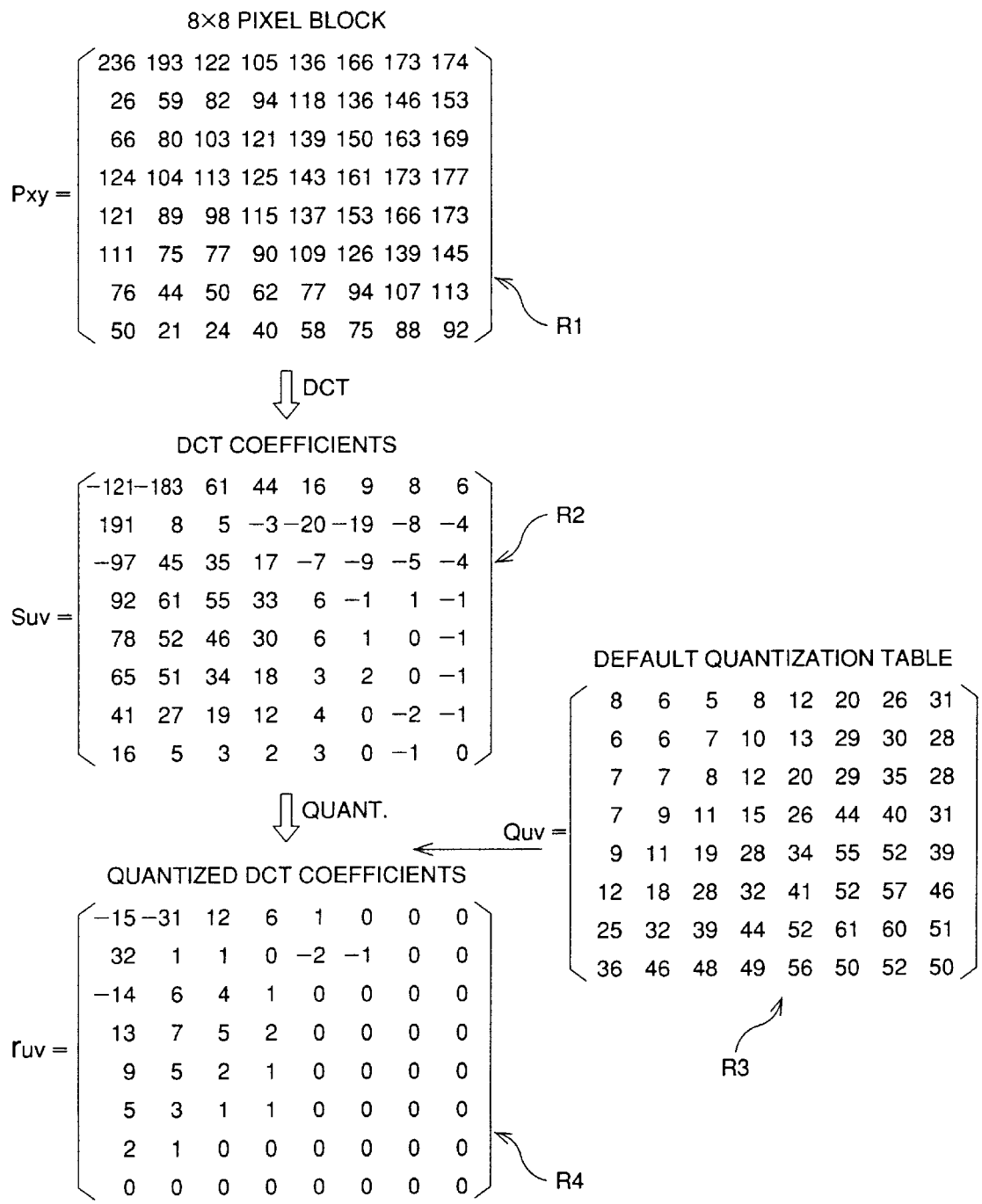
FIG. 2 is a view showing an example of an image compression process using a default quantization table.

In the image compression device 20, the image data such as the luminance data Y is divided into a predetermined number of pixel blocks collectively commensurate to one frame. Each block is then individually processed. As shown in FIG. 2, each pixel block R1 is composed of 8×8 pixel data $P_{xy}$, which indicate the luminance data Y, for example.

In the DCT processing unit 21, every block R1 of pixel data of the original image is subjected to a two-dimensional DCT, and thus, DCT coefficients $S_{uv}$ (i.e., image-processed data) in an 8×8 matrix are obtained for one block. In the DCT coefficients matrix R2, a DCT coefficient (e.g.-121, show as FIG. 2), at the uppermost left corner, is a DC (Direct Current) component, while the remaining 63 DCT coefficients are AC (Alternating Current) components. Also, in the matrix, a horizontal spatial frequency component, "u", increases as it's position tends towards the right, and a vertical spatial frequency component, "v", increases as it's position descends.

The DCT coefficients matrix R2 outputted from the DCT processing unit 21 is quantized by a default quantization table (either Qy or Qc) R3 in a quantization processing unit 22. A quantization table R3, arranged as an 8×8 matrix, is provided for both the luminance data Y and the color difference data Cb and Cr. Each component of the DCT coefficients matrix R2 is quantized by being divided by the corresponding quantization coefficient. Namely, the number of the components in the DCT coefficients matrix R2 is equal to the number of the quantization coefficients. Each of the quantized DCT coefficients $r_{uv}$ is rounded to the nearest integer, and therefore, a part of the image information is lost from each of the quantized DCT coefficients $r_{uv}$.

The quantized DCT coefficients matrix R4 outputted by the quantization processing unit 22 is inputted into a compression processing unit 23, and is Huffman-encoded according to a predetermined algorithm. The compressed image data, obtained by the Huffman-encoding, is stored in a compressed image data recording area Ml of a recording medium M. The default quantization tables Qy and Qc are stored in a first table recording area M2 of the recording medium M. Note that the Huffman-encoding is well known, and therefore a detailed explanation thereof is omitted in this specification.

The quantized DCT coefficients matrix R4 is inputted into both the compression processing unit 23 and an optimum quantization coefficient calculation unit 26. The DCT coefficients matrix R2 is also inputted to the optimum quantization coefficent calculation unit 26. In the optimum quantization coefficient calculation unit 26, an optimum quantization table, by which a quantization error becomes a minimum, is obtained as described below.

At this point, it is supposed that the components of the quantization table R3 are $Q_{uv}$, and in the "i"th number block, the components of tine DCT coefficients matrix R2 are $S_{iuv}$, and the components of the quantized DCT coefficients matrix R4 are $r_{iuv}$. Further, it is supposed that the components of the dequantized DCT coefficients, obtained by multiplying the quantized DCT coefficients bad the quantization table, are $S'_{iuv}$. For corresponding components the square of a quantization error $E_{uv}$ summed for one frame of image data is:

$$E_{uv} = \sum (S'_{iuv} - S_{iuv})^2 \quad (1)$$
$$= \sum (r_{iuv} \times Q_{uv} - S_{iuv})^2$$

wherein Σ impliets the sum total of blocks forming the one frame of image data.

Equation (1) is differentiated by the corresponding values of $Q_{uv}$ to obtain:

$$dE_{uv}/dQ_{uv} = 2\Sigma r_{iuv}(r_{iuv} \times Q_{uv} - S_{iuv}) \quad (2)$$

It is supposed that, when the sum of the square of the quantization error $E_{uv}$ is a relative minimum value, $Q_{uv}$ is set to $Q'_{uv}$. Thus, the corresponding value $Q'_{uv}$ is obtained by setting equation (2) to 0, and transforming the equation. Namely, $$Q'_{uv} = \text{round}(\Sigma(r_{iuv} \times S_{iuv})/\Sigma r_{iuv}^2) \quad (3)$$

wherein the term "round", in this equation, is an approximation function which approximates, to the nearest integer, the value of the argument.

Each component of the optimum quantization table matrix is calculated according to equation (3). In an optimum quantization tabLe generation unit 27, an optimum quantization table Qsy for thes luminance data Y and an optimum quantization table Qsc for the color difference data Cr and Cb are generated, based on the results of equation (3). These optimum quantization tables Qsy and Qsc are converted to data, according to a predetermined format in a quantization table recording unit 28, and are recorded in a second table recording area M3 of a recording medium M.

Mode information MI, indicating that the default quantization tables Qy and Qc and the optimum quantization tables Qsy and Qsc are istored in the recording medium M, is transformed to data according to a predetermined format in an information recording unit 29, and is stored in an information recording area M4 of the recording medium M.

Figure 3:
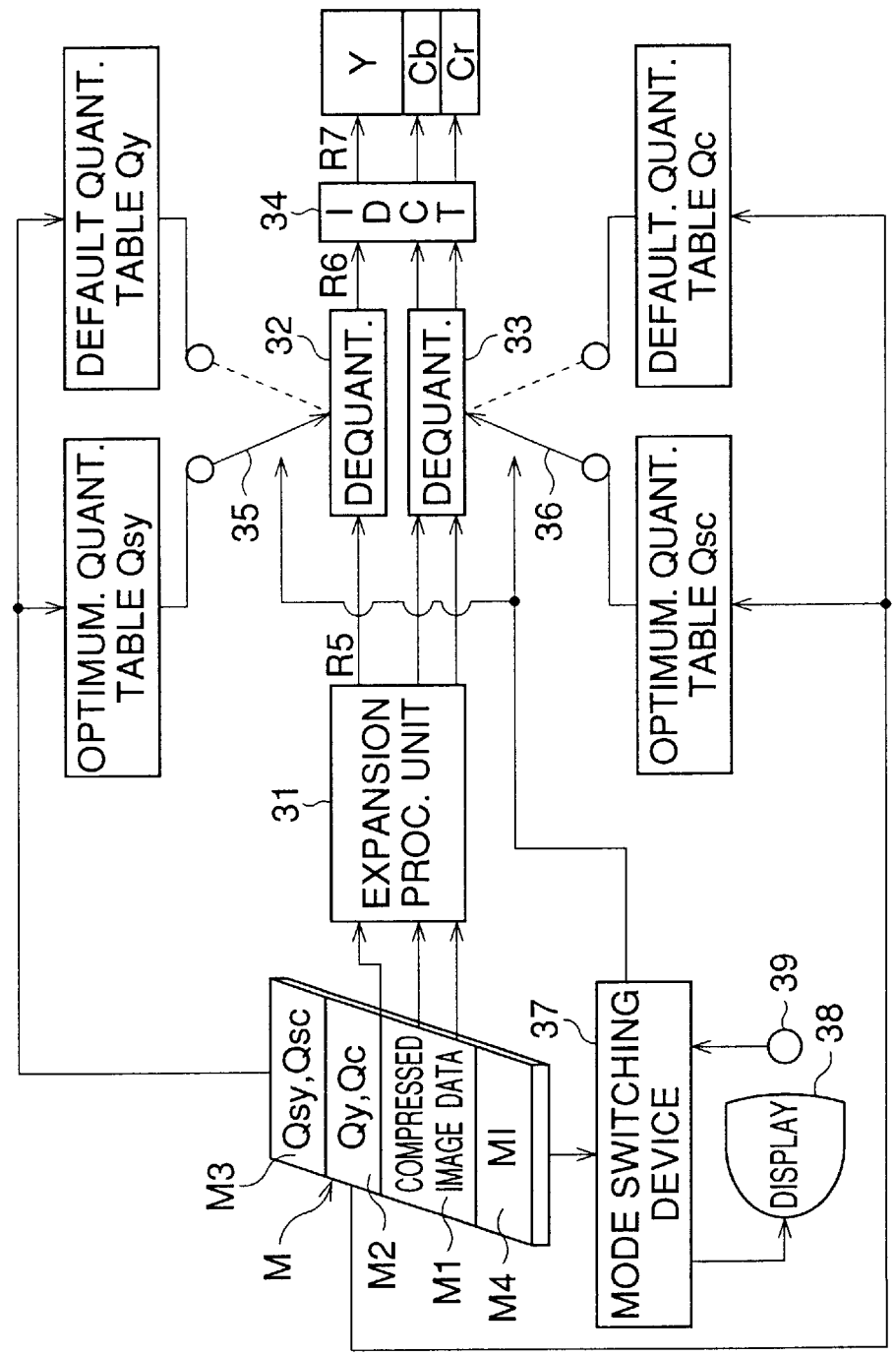
FIG. 3 is a block diagram showing an image expansion device of the first embodiment of the present invention.

FIG. 3 is a block diagram of an image expansion device of the first embodiment of the present invention.

The compressed image data, corresponding to the luminance data Y and the color difference data Cb and Cr, read from the compressed image data recording area M1 of the recording medium M is decoded, in an expansion processing unit 31, and is converted to the quantized DCT coefficients. The decoding is the inverse of the Huffman encoding, which is well known. The quantized DCT coefficients, obtained by the decoding, are dequantized, in a dequantization processing unit 32 for the luminance data or a dequantization processing unit 33 for the color difference data, using the default quantization tables Qy and Qc (or the optimum quantization tables Qsy and Qsc), respectively, so that the dequantized DCT coefficients are obtained. These dequantized DCT coefficients are then subjected to a two-dimensional inverse discrete cosine transformation (two-dimensional IDCT), in an IDCT processing unit 34, so that the luminance data Y and the color difference data Cb and Cr are reproduced.

The default quantization tables Qy and Qc and the optimum quantization tables Qsy and Qsc are stored, respectively, in the first table recording area M2 and in the second table recording area M3, of the recording medium M. The default quantization tables Qy and Qc or the optimum quantization tables Qsy and Qsc are used in the dequantization processing units 32 and 33 in accordance with the operation of switches 35 and 36.

The quantization tables Qy and Qsy, for the luminance signal, are inputted into the dequantization processing unit 32 through the use of switch 35. The quantization tables Qc and Qsc, for the color difference data, are inputted into the dequantization processing unit 33 through use of the switch 36. The switches 35 and 36 are operated in accordance with a switch command signal outputted by a mode switching device 37. A display device 38 and a selection button 39 are connected to the mode switching device 37. Based on the mode information MI, read from the information recording area M4 of the recording medium M, an indication, implying that the default quantization tables Qy and Qc and the optimum quantization tables Qsy and Qsc can be selected, is registered on the display device 38. By operating the button 39 in accordance with the indication, the switches 35 and .36 are operated.

When the switches 35 and 36 are set to the positions shown by the broken lines in FIG. 3, such that the default quantization tables Qy and Qc are selected, dequantization is carried out in the dequantization processing units 32 and 33, using the quantization tables Qy and Qc. Conversely, when the switches 35 and 36 are set to the positions shown by the solid lines in FIG. 3, such that the optimum quantization tables Qsy and Qsc are selected, dequantization is carried out in the dequantization processing units 32 and 33, using the quantization tables Qsy and Qsc.

Figure 4:
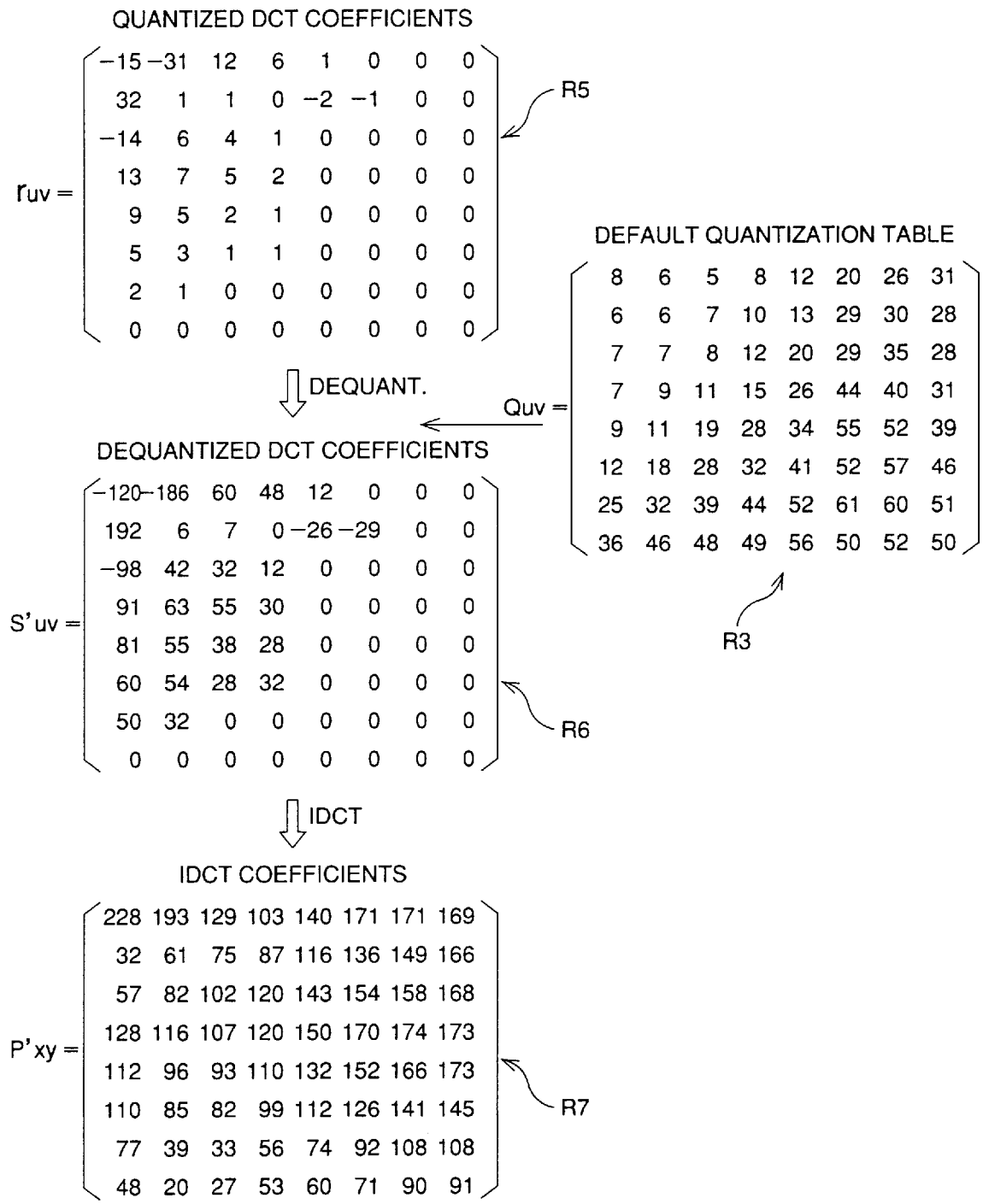
FIG. 4 is a view showing an example of an image expansion process using the default quantization table.

FIG. 4 shows an example of quantized DCT coefficients matrix R5 obtained by the expansion processing unit 31, dequantized DCT coefficients matrix R6 obtained by the dequantization processing unit 32 and IDCT coefficients matrix R7 obtained by the IDCT processing unit 34. This example shows the quantized DCT coefficients matrix R5 being dequantized using the default quantization table R3.

Namely, the quantized DCT coefficients $r_{uv}$ are dequantized by being multiplied by the corresponding quantization coefficients Quv, included in the default quantization table R3, so that the quantized DCT coefficients $r_{uv}$ are converted to dequantized DCI coefficients $S'_{uv}$. The dequantized DCT coefficients matrix R6 corresponds to the DCT coefficients matrix R2 shown in FIG. 2. The dequantized DCT coefficients $S'_{uv}$ are subjected to the two dimensional IDCT process, in the IDCT processing unit 34, and are converted to IDCT coefficients $P'_{xy}$. The IDCT coefficients matrix R7 corresponds to the pixel block R1 shown in FIG. 2.

Figure 5:
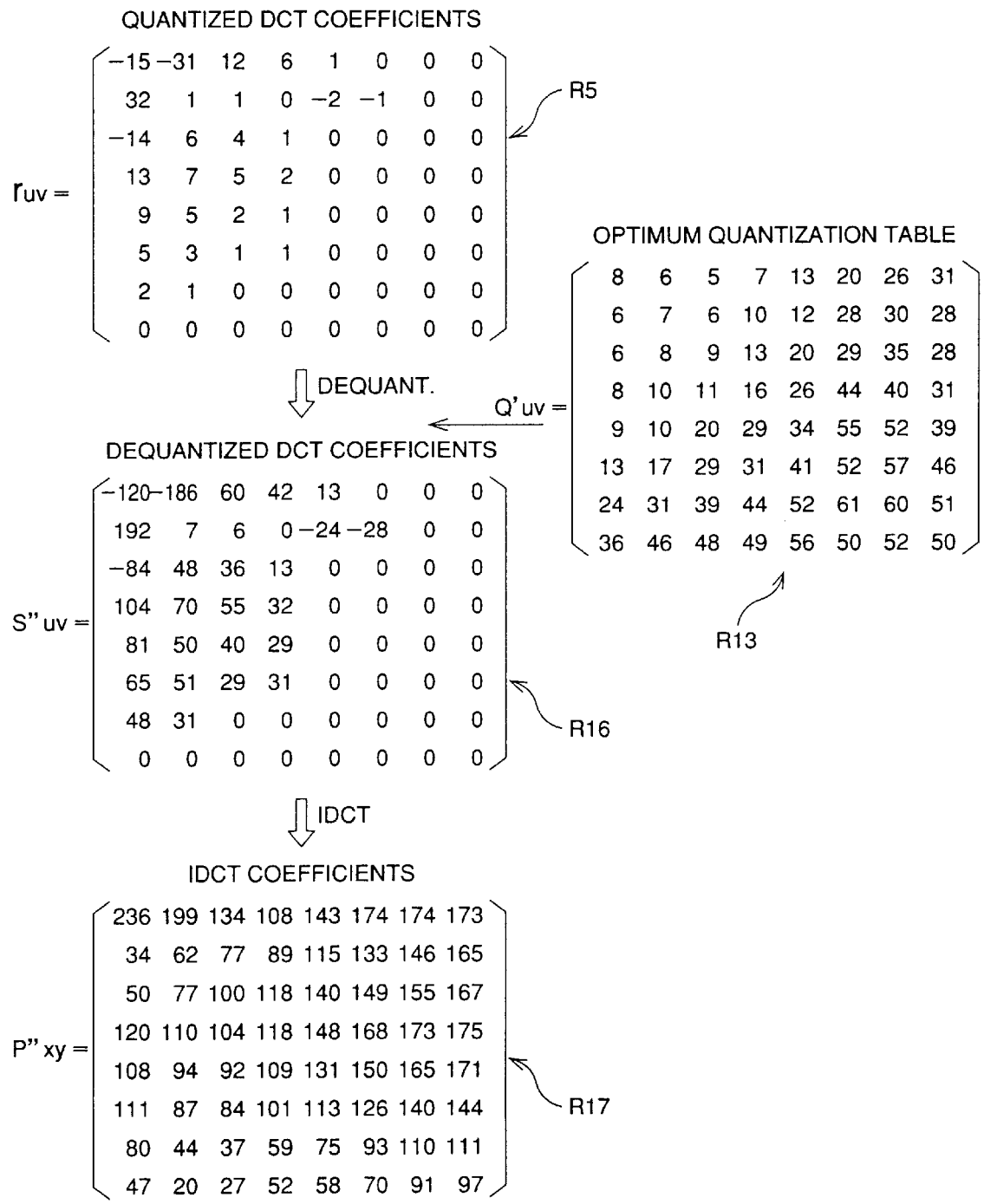
FIG. 5 is a view showing an example of an image compression process using an optimum quantization table.

FIG. 5 shows an example in which the quantized DCT coefficients matrix R5, obtained by the expansion processing unit 31, is dequantized using an optimum quantization table R13. As understood when comparing the cases shown in FIGS. 2, 4 and 5, a dequantized DCT coefficients matrix R16, which is obtained using the optimum quantization table R13, has closer values to the DCT coefficients matrix R2, which has not been quantized, in comparison with the dequantized DCT coefficients matrix R6, which is obtained using the default quantization table R3. Similarly, a dequantized DCT coefficients matrix R17, which is obtained using the optimum quantization table R13, has closer values to the pixel data Pxy of the pixel block R1 of the original image, in comparison with the dequantized DCT coefficients matrix R7, which is obtained using the default quantization table R3.

Figure 6:
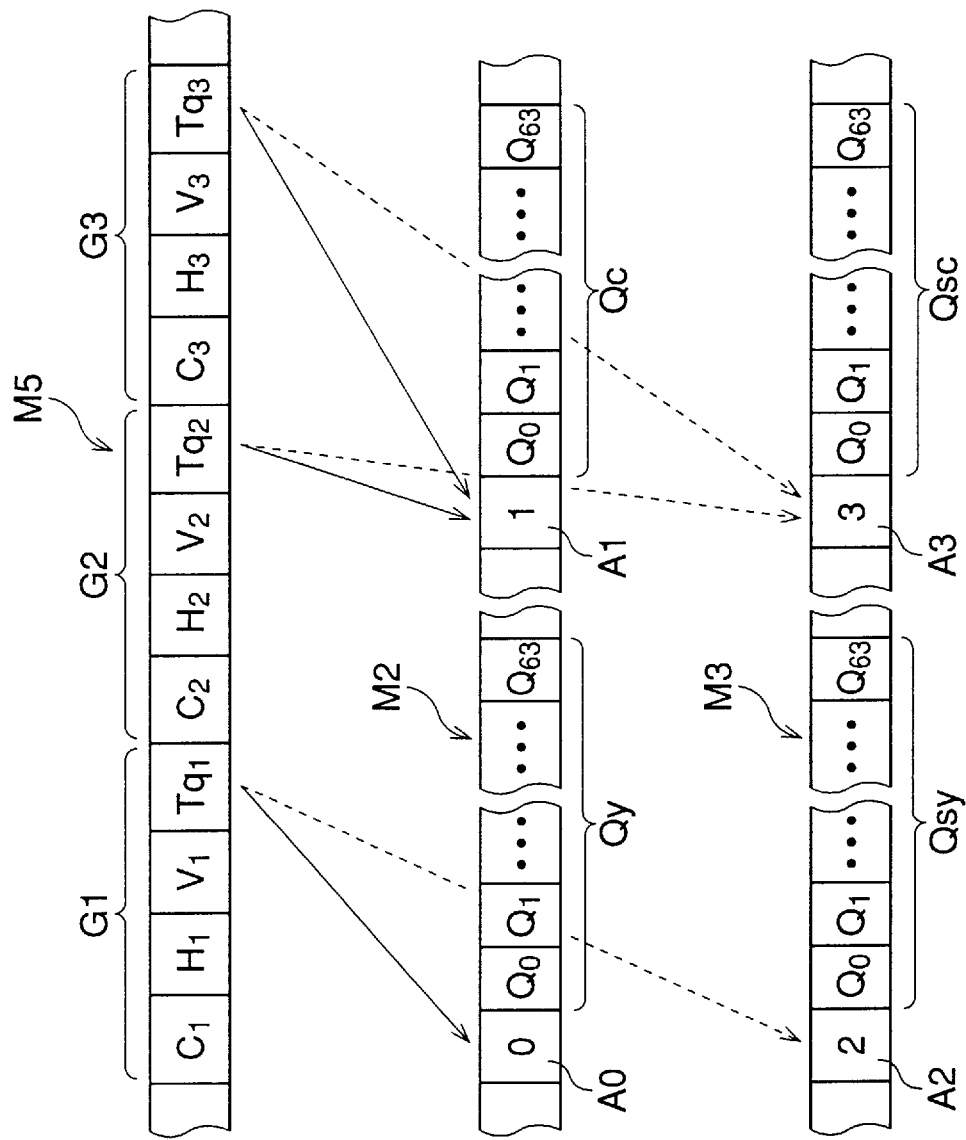
FIG. 6 is a view showing a construction of a first table recording area, a second table recording area and a parameter recording area provided in a recording medium.

FIG. 6 shows a construction of the first table recording area M2, the second table recording area M3 and a parameter recording area M5, provided in the recording medium M.

The parameter recording area M5 is composed of a first group G1, a second group G2 and a third group G3. Component recognition information $C_1$ means that a parameter regarding the luminance data Y is stored in the first group G1. $H_1$ represents a horizontal sampling factor and $V_1$ represents a vertical sampling factor. These sampling factors $H_1$ and $V_1$ are determined according to a recommendation by the JPEG. $Tq_1$ indicates quantization table selection information, the selection information being a value of a quantization table number which corresponds to the first table recording area M2 or the second table recording area M3, in which the quantization table regarding the luminance data Y is stored.

Similarlyr, component recognition information $C_2$ means that a parameter regarding the color difference data Cb is stored in the second group G2. $H_2$ represents a horizontal sampling factor and $V_2$ represents a vertical sampling factor. These sampling factors $H_2$ and $V_2$ are determined according to a recommendation by the JPEG. $Tq_2$ is quantization table selection information regarding the color difference data Cb. Component recognition information $C_3$ means that a parameter regarding the color difference data Cr is stored in the third group G3. $H_3$ represents a horizontal sampling factor and $V_3$ indicates a vertical sampling factor. These sampling factors $H_3$ and $V_3$ are determined according to a recommendation by the JPEG. $Tq_3$ is quantization table selection information regarding the color difference data Cr.

As described above, the first recording area M2 is provided for recording the default quantization tables Qy and Qc and the second recording area M3 is provided for recording the optimum quantization tables Qsy and Qsc.

Regarding the default quantization tables Qy and Qc, a first quantization table number of "0" (reference is A0 in FIG. 6) is stored in an address of $Tq_1$ as first quantization table selection information, and 64 quantization coefficients $Q_0, Q_1, \ldots Q_{63}$ forming the quantization table Qy, used for quantizing the luminance data Y, are stored in the addresses following the first quantization table number. Second quantization table numbers of "1" (reference A1 in FIG. 6) are stored in addresses of $Tq_2$ and $Tq_3$ as second quantization table selection information, where Tq2 and $Tq_3$ have identical addresses, and 64 quantization coefficients $Q_0, Q_1, \ldots Q_{63}$ forming the quantization table Qc, used for quantizing the color difference data Cb and Cr, are stored in the addresses following the second quantization table numbers.

Regarding the optimum quantization tables Qsy and Qsc, a third quantization table number of "2" (reference A2 in FIG. 6) is stored in an address of $Tq_1$ as third quantization table selection information, and 64 quantization coefficients $Q_0, Q_1, \ldots Q_{63}$ forming thus quantization table Qsy, used for quantizing the luminance data Y, are stored in the addresses following the third quantization tabLe number. Fourth quantization table numbers of "3" (reference A3 in FIG. 6) are stored in addresses of $Tq_2$ and $Tq_3$ as fourth quantization table selection information, where the addresses of $Tq_2$ and $Tq_3$ are identical, and 64 quantization coefficients $Q_0, Q_1, \ldots Q_{63}$ forming the quantization table Qsc used for quantizing the color difference data Cb and Cr, are stored in the addresses following the fourth quantization table numbers.

Thereforea, by setting each selection information ($Tq_1$, $Tq_2$ and $Tq_3$) to an integer value of one of 0 through 3, corresponding to the required quantization table and, thereby, to the operations of the switches 35 and 36 shown in FIG. 3, the predetermined quantization tables Qy, Qc, Qsy and Qsc are selected.

Figure 7:
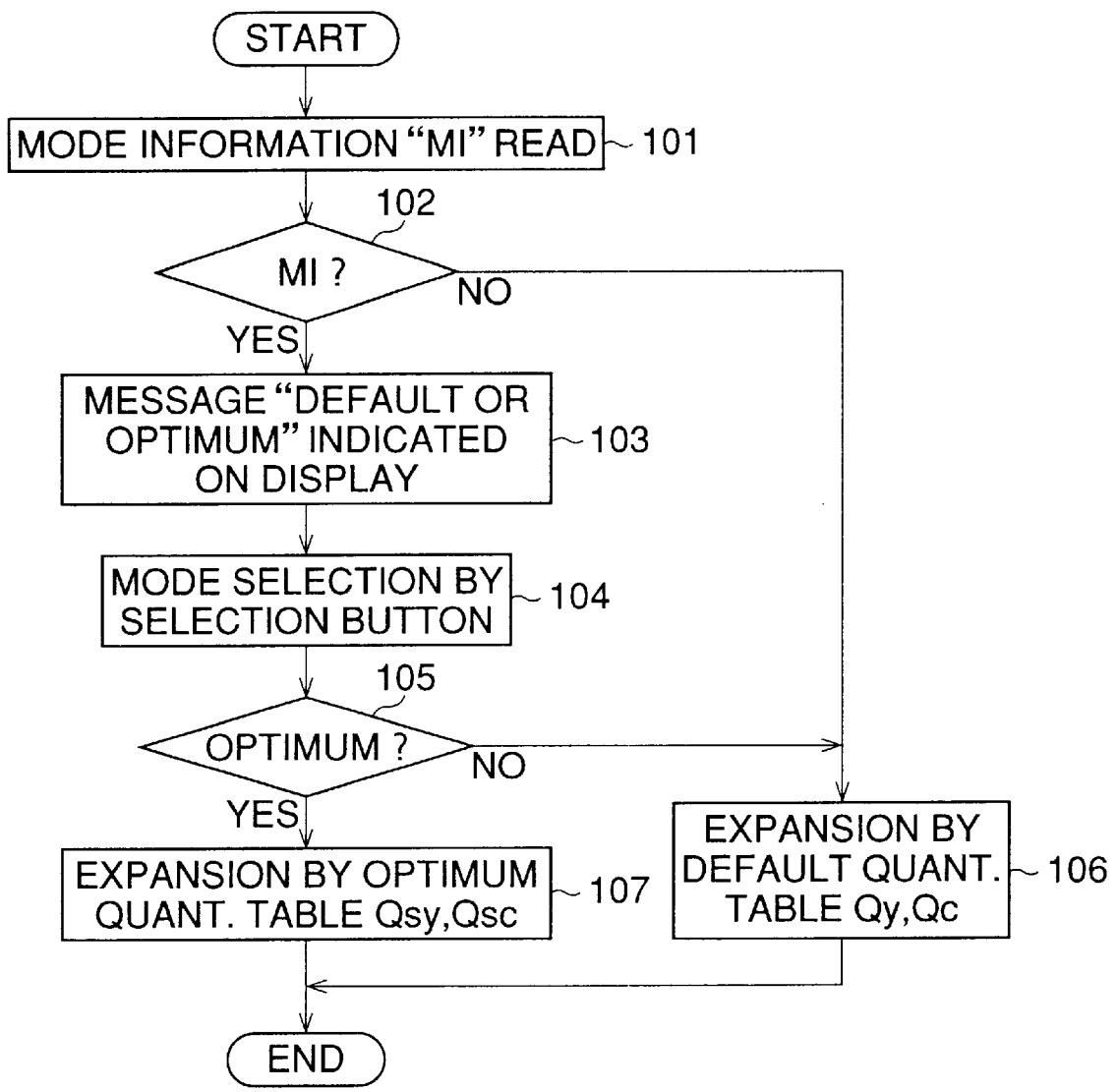
FIG. 7 is a flow chart showing an image expansion process.

FIG. 7 is a flow chart showing an image expansion process.

In Step 101, data stored in the information recording area M4 of the recording medium M is read out. In Step 102, it is determined, based on the data, whether mode information MI is stored in the information recording area M4. When the mode information MI is stored, Step 103 is executed so that a message, implying that the default quantization table can be used or the optimum quantization table can be used, is indicated by the display device 38.

In Step 104, button 39 is operated, so that a mode of the image expansion process is selected. When a high quality mode (i.e. use of the optimum quantization table) is selected by button 39, the process goes from Step 105 to Step 107, so that the expansion process is performed using the optimum quantization tables Qsy and Qsc, and then, this image expansion process program ends. Conversely, when the high quality mode is not selected by the button 39 and, also, when it is determined in Step 102 that the mode information MI is not stored, Step 106 is executed so that the expansion process is performed using the default quantization tables Qy and Qc.

As described above, according to the embodiment, when the default quantization tables Qy and Qc are used in the image expansion process, the original image having a usual reproducible quality can be obtained. Therefore, a usual expansion process can be performed, on image data stored in the recording medium M, using a conventional expansion device. Further, when the expansion process is carried out by an image expansion device having the selection button 39 and the switches 35 and 36, the optimum quantization tables Qsy and Qsc can be used, and therefore, an image which is as close as possible to the original image can be reproduced.

In the first embodiment, only the default quantization tables Qy and Qc or the optimum quantization tables Qsy and Qsc are used. According to such a device, however, the quality of the reproduced image is not fully improved as described below.

FIG. 8 shows a relationship between the quantized DCT coefficients $r_{uv}$ and the DCT coefficients $S_{uv}$ when the quantization coefficients $Q_{uv}$ included in the quantization table are 12 and 11, respectively. For example, when the quantization coefficient $Q_{uv}$ is 12, the quantized DCT coefficient $r_{uv}$ is 3 if the DCT coefficient $S_{uv}$ is 30 through 41. When the quantization coefficient $Q_{uv}$ is 11, the quantized DCT coefficient $r_{uv}$ is 3 if the DCT coefficient $S_{uv}$ is 28 through 38.

Now, suppose that, in an 8×8 matrix pixel block, the quantization coefficient $Q_{uv}$=12, contained in the default quantization tables Qy and Qc, is changed to the quantization coefficient Q'$_{uv}$=1.1 in the optimum quantization tables Qsy and Qsc obtained accordirng to the equation (3). When the DCT coefficient S$_{uv}$, outputted byr the DCT processing unit 21 (see FIG. 1) of the image compression device 20, is 78 through 89, this DCT coefficient is quantized by the quantization coefficient Q$_{uv}$=12 in the quantization processing unit 22, so that the quantized DCT coefficient r$_{uv}$=7 is obtained. If this quantized DCT coefficient r$_{uv}$=7 is dequantized by the quantization coefficient Q'$_{uv}$=11 of the optimum quantization table, in the dequantization processing units 32 or 33 Isee FIG. 3) of the image expansion device, the calculation result is S'$_{uv}$=7×11=77, which is out of the range of the original DCT coefficient S$_{uv}$ which is between 78 and 89.

Thus, if the dequantized DCT coefficient S'$_{uv}$ is out of the range in which the original DCT coefficient S$_{uv}$ should be included, a quantization error is generated, which causes the quality of the image, reproduced by the expansion process, to be lowered. Namely, in such a case, the quantization errors of the default tables Qy and Qc are smaller than those of the optimum quantization tables Qsy and Qsc. Therefore, by using the default quantization tables Qy and Qc, a greater loss of image quality is prevented.

FIG. 9 shows a relationship between the quantized DCT coefficient r$_{uv}$ and the dequantized DCT coefficient S'$_{uv}$ obtained by dequantizing the quantized DCT coefficient r$_{uv}$ by the quantization coefficient Q$_{uv}$=11. As understood from comparison between FIGS. 8 and 9, when the quantization coefficient Q'$_{uv}$=11, a phenomenon in which the dequantized DCT coefficient S'$_{uv}$ is out of the range of the original DCT coefficient S$_{uv}$ occurs only when the quantized DCT coefficient r$_{uv}$≧7. Similarly, with the other quantization coefficients Q'$_{uv}$, the phenomenon also easily occurs when the quantized DCT coefficients r$_{uv}$ have relatively high values. The boundary for the quantized DCT coefficients r$_{uv}$, which indicates whether or not the quantized DCT coefficients are out of the range of the original DCT coefficients S$_{uv}$, is (Q$_{uv}$/2+1) when the quantization coefficients Q$_{uv}$ are even numbers, and is ((Q$_{uv}$−1)/2+1) when the quantization coefficients Q$_{uv}$ are odd numbers.

In a second embodiment described below, either first quantization coefficients contained in the default quantization tables Qy and Qc or second quantization coefficients contained in the optimum quantization table Qsy and Qsc are selected, so that the quantization error can be controlled to achieve a minimum value.

Figure 10:
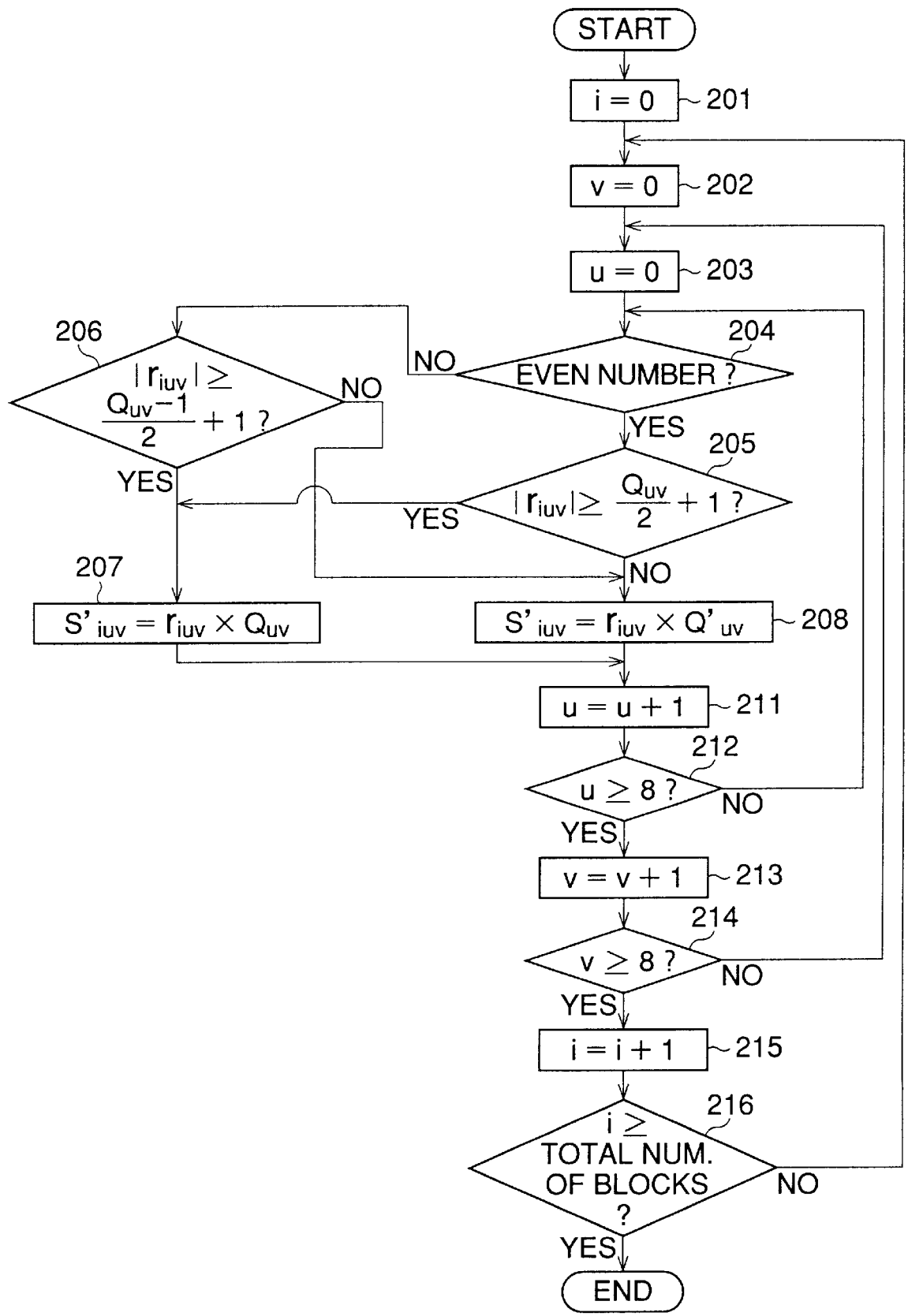
FIG. 10 is a flow chart of a program, which is executed in the expansion process of the second embodiment, to dequantize the quantized DCT coefficient $r_{iuv}$.

FIG. 10 shows a flow chart of a program, which is executed in the expansion process in the image expansion device of the second embodiment, to dequantize the quantized DCT coefficients r$_{iuv}$.

In Step 201, a parameter "i", indicating a serial number of the blocks forming one frame of image data, is set to 0. In Step 202, a parameter "v", indicating a vertical position of a spatial frequency within the 8×8 matrix, is set to 0, and in Step 203, a parauneter "u", indicating a horizontal position of a spatial frequency within the 8×8 matrix, is set to 0.

In step 204, it is determined whether the quantization coefficient Q$_{uv}$ for dequantizing the quantized DCT coefficient r$_{iuv}$, is an even number. When the quantization coefficient Q$_{uv}$ is an even number, Step 205 is executed, so that it is determined whether the absolute value of the quantization DCT coefficient r$_{iuv}$ is greater than or equal to the first boundary vialue (Q$_{uv}$/2+1). When the absolute value of the quantized DCT coefficient r$_{iuv}$ is greater than or equal to the first boundary value, Step 207 is executed, so that the dequantized DCT coefficient S'$_{iuv}$ is obtained according to the following equation:

$$S'_{iuv}=r_{iuv}\times Q_{uv}$$

Namely, the dequantization is carried out using the quantization coefficient Q$_{uv}$ of the default quantization table.

When the absolute value of the quantized DCT coefficient r$_{iuv}$ is less than the first boundary value, Step 208 is executed, so that the dequantized DCT coefficient S'$_{iuv}$ is obtained, using the quantization coefficient Q'$_{uv}$ of the optimum quantization table, according to the following equation:

$$S'_{iuv}=r_{iuv}\times Q'_{uv}$$

Conversely, when it is determined in Step 204 that the quantization coefficient Q$_{uv}$ is an odd number, Step 206 is executed, so that it is determined whether the absolute value of the quantized DCT coefficient r$_{iuv}$ is greater than or equal to the second boundary value ((Q$_{uv}$−1)/2+1). When the absolute value of the quantized DCT coefficient r$_{iuv}$ is greater than or equal to the second boundary value, Step 207 is executed in which the dequantization is performed using the quantization coefficient Q$_{uv}$ of the default quantization table. When it is determined in Step 206 that the absolute value of the quantized DCT coefficient r$_{iuv}$ is less than the second boundary value, Step 208 is executed in which the dequantization is performed using the quantization coefficient Q'$_{uv}$ of the optimum quantization table.

In step 211, the parameter "u" is incremented by 1. In Step 212, it is determined whether the parameter "u" is greater than or equal to 8. When the parameter "u" has not reached 8, the process goes back to Step 204, so that Steps 204 through 211 are executed regarding the next parameter "u".

When it is determined in Step 212 that the parameter "u" is greater than or equal to 8, Step 213 is executed in which the parameter "v" is incremented by 1. Then, it is determined in Step 214 whether or not the parameter "v" is greater than or equal to 8. When the parameter "v" has not reached 8, the process goes back to Step 203, so that Steps 203 through 213 are executed regarding the next parameter "v".

When it is determined in Step 214 that the parameter "v" is greater than or equal to 8, Step 215 is executed in which the parameter "i" is incremented by 1. In step 216, it is determined whether the parameter "i" is greater than or equal to the total number of blocks. When it is determined that the parameter "i" has not reach.ed the total number of blocks, the process goes back to Step 202, so that Steps 202 through 215 are executed regarding the next block.

When it is determined in Step 216 that the parameter "i" is greater than or equal to the total number of blocks, this program ends, since the dequantization has been completed for all of the blocks.

Figure 11:
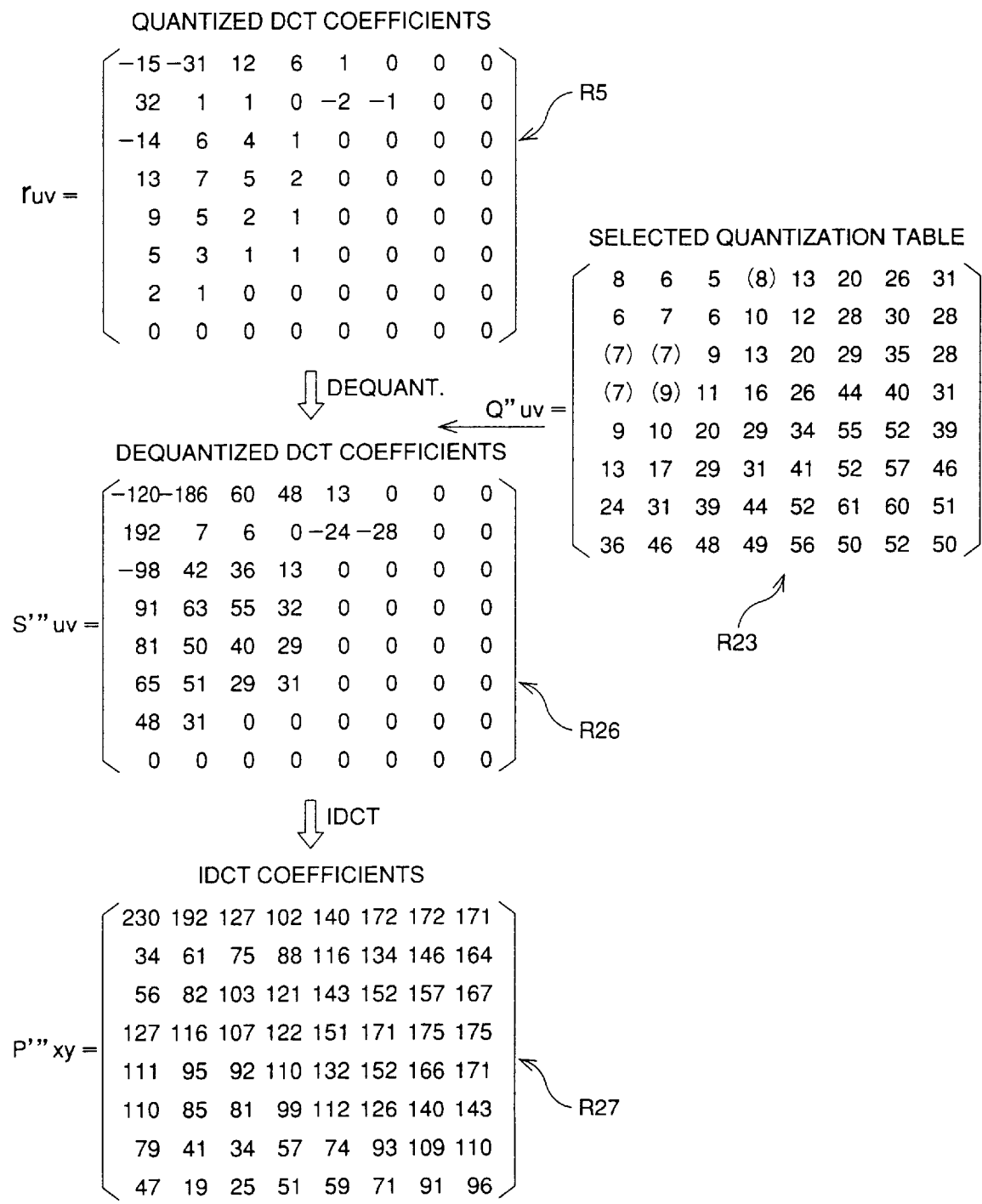
FIG. 11 is a view showing an example of the dequantization carried out by the program shown in FIG. 10.

FIG. 11 shows an example of the dequantization carried out by the program shown in FIG. 10. In this drawing, a selected quantization table R23 is composed of the quantization coefficients Q$_{uv}$ and Q'$_{uv}$, which are selected based on the result of the determinations in Steps 205 and 206 of the program shown in FIG. 10. Namely, in the program shown in FIG. 10, the selected quantization table R23 is obtained by completing the loop formed by steps 202 through 214 for one block. Note that the numerals bounded by parentheses in the selected quantization table R23 (Q"$_{30}$=(8), for example) is a quantization coefficient contained in the default quantization table R3 (see FIG. 4), and the numerals not bounded by parentheses (Q"$_{20}$=5, for example) is a quantization coefficient contained in the optimum quantization table R13 (see FIG. 5).

In FIG. 11, the quantization coefficients matrix R5 is dequantized by the selected quantization table R23, so that the dequantized DCT coefficients matrix R26 is obtained. The dequantized DCT coefficients matrix R26 is subjected to the IDCT, and thus, is converted to the IDCT coefficients matrix R27. As understood from comparing the cases shown in FIGS. 2, 5 and 11, the dequantized DCT coefficients matrix R26, which is obtained using the selected quantization table R23, has values which are closer to those of the DCT coefficients matrix R2, which has not been quantized in comparison with the dequantized DCT coefficients matrix R16, which is obtained using the optimum quantization table R13. Similarly, the IDCT coefficients matrix R27, which is obtained using the selected quantization table R23, has closer values to those of the pixel data Pxy of the pixel block R1 of th(e original image, in comparison with the IDCT coefficients matrix R17, which is obtained using the optimum quantization table R13.

As described above, according to the second embodiment, the quantization coefficient $Q'_{uv}$ of the optimum quantization table is selected when the quantized DCT coefficient $r_{iuv}$ is less than the boundary value, and the quantization coefficient $Q_{uv}$ of the default quantization table is selected when the quantized DCT coefficient $r_{iuv}$ is greater than or equal to the boundary value. Accordingly, a phenomenon, in which the quantization error tends to increase when the quantized DCT coefficient $r_{iuv}$ is relatively large, is prevented. Therefore, when using the expansion process, a reproduced image having an improved quality and, thereby, being as close to the original image as possible is obtained.

In the second embodiment, one quantization coefficient $Q'_{uv}$ of the optimum quantization table or one quantization coefficient $Q_{uv}$ of the default quantization table is selected in accordance with the amount of the corresponding quantized DCT coefficient $r_{iuv}$, in the expansion process. In this case, when the quantized DCT coefficient riuv is greater than or equal to the boundary value, the calculation of (3), by which each component of the matrix of the optimum quantization table is obtained, does not need to be considered since the default quantization table is applied. Thus, in a third embodiment described below, when the optimum quantization table is generated in the compression process, only a case in which the quantized DCT coefficients riu are less than the boundary values are taken into consideration, so that a further improved optimum quantization table can be generated.

Figure 12A:
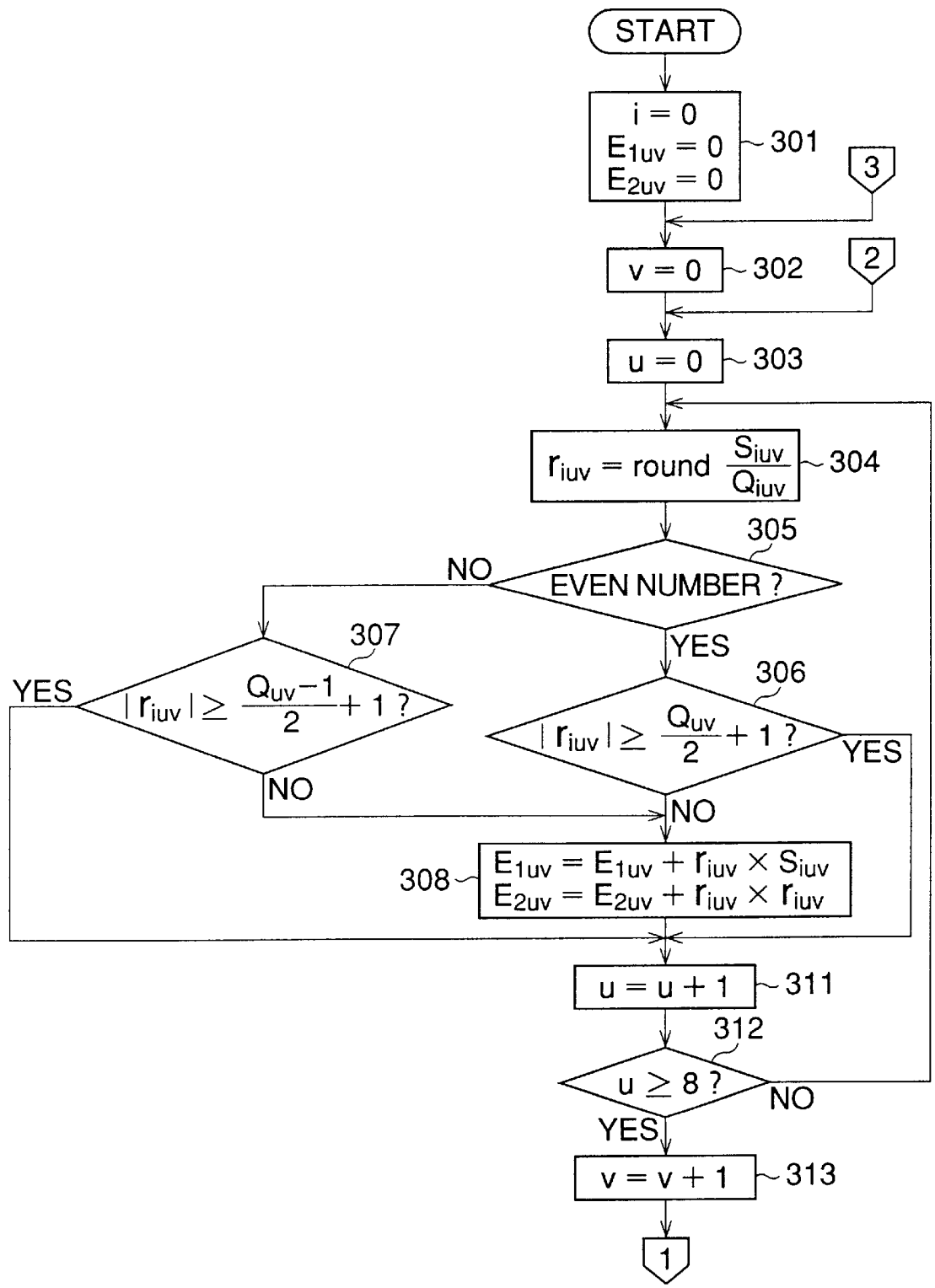
FIGS. 12A and 12B show a flow chart of a program which is executed in a compression process of an image compression device of a third embodiment, so that an optimum quantization table is generated.
Figure 12B:
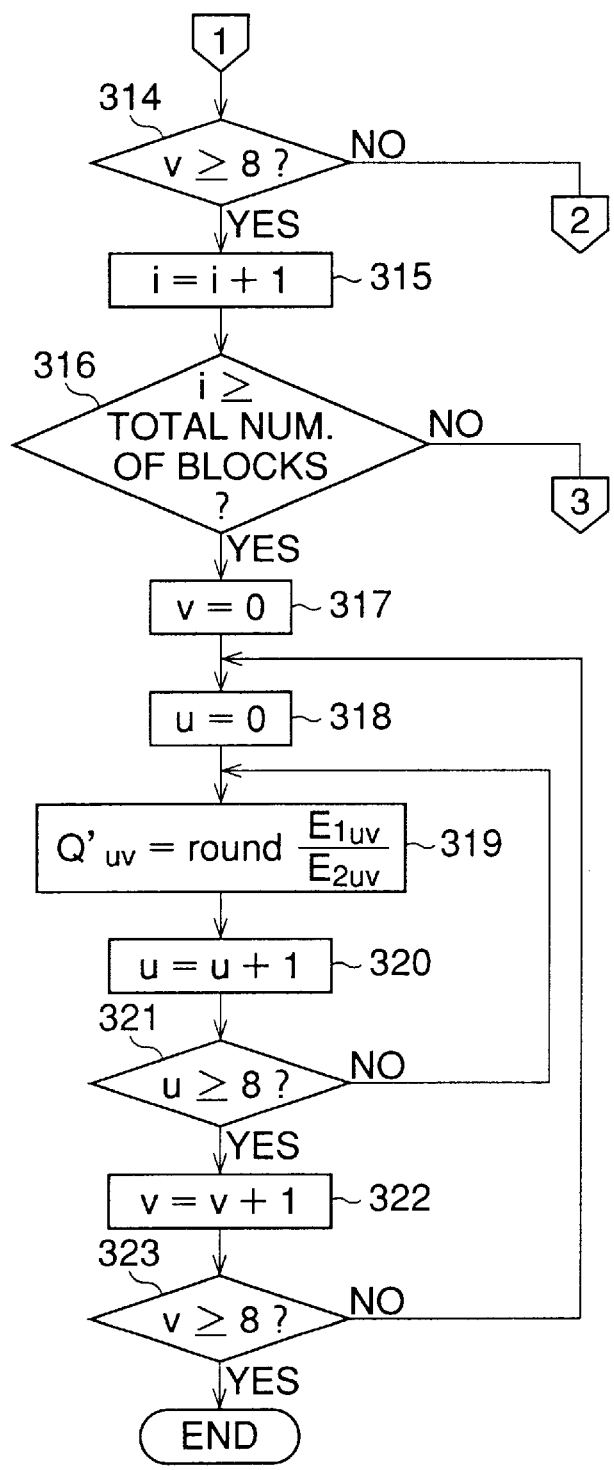

FIGS. 12A and 12B show a flow chart of a program which is executed in a compression process of an image compression device of the third embodiment so that an optimum quantization table is generated.

In step 301, parameter "i", indicating a serial number of a block forming a part of one image, and values of $E_{1uv}$ and $E_{2uv}$, which correspond to a numerator and a denominator of equation (3), respectively, are initially all set to 0. In Step 302, parameter "v", indicating the vertical position of the spatial frequency within the 8×8 matrix, is set to 0, and in Step 303, paramneter "u", indicating the horizontal position of the spatial frequency within the matrix, is set to 0.

In Step 304, the quantized DCT coefficient $r_{iuv}$ is obtained according to the following equation:

$$r_{iuv}=\text{round}(S_{iuv}/Q_{uv})$$

wherein the terri "round", in this equation, is an approximation function which approximates, to the nearest integer, the value of the argument.

In Step 305, it is determined whether the quantization coefficient $Q_{uv}$ is an even number. When the quantization coefficient $Q_{uv}$ is an even number, Step 306 is executed in which it is determined whether the absolute value of the quantized DCT coefficient $r_{iuv}$ is greater than or equal to a first boundary value ($Q_{uv}/2+1$). When the absolute value of the quantized DCT coefficient $r_{iuv}$ is less than the first boundary value, Step 308 is executed so that the numerator and the denominator of equation (3)are calculated according to the following equations:

$$E_{1uv}=E_{iuv}+r_{iuv}\times S_{iuv}$$

$$E_{2uv}=E_{2uv}+r_{iuv}\times r_{iuv}$$

Conversely, when it is determined in Step 306 that the absolute value of the quantized DCT coefficient $r_{iuv}$ is greater than or equal to the first boundary value, Step 308 is skipped.

When it is determined in Step 305 that the quantization coefficient $Q_{uv}$ is an odd number, Step 307 is executed in which it is determined whether the absolute value of the quantized DCT coefficient $r_{iuv}$ is greater than or equal to the second boundary value (($Q_{uv}-1$)/2+1). When the absolute value of the quantized DCT coefficient $r_{iuv}$ is less than the second boundary value, Step 308 is executed, and when the absolute value of the quantized DCT coefficient $r_{iuv}$ is greater than or equal to the second boundary value, Step 308 is skipped.

In Step 311, the parameter "u" is incremented by 1. In step 312, it is determined whether the parameter "u" is greater than or equal to 8. When the parameter "u" has not reached 8, the process goes back to Step 304, so that Steps 304 through 311 are executed for the next parameter "u".

When it is determined in Step 312 that the parameter "u" is greater than or equal to 8, Step 313 is executed in which the parameter "v" is incremented by 1. Then, it is determined in Step 314 whether the parameter "v" is greater than or equal to 8. When the parameter "v" has not reached 8, the process goes back to Step 303, so that Steps 303 through 313 are executed regarding the next parameter "v".

When it is determined in Step 314 that the parameter "v" is greater than or equal to 8, Step 315 is executed in which the parameter "i" is incremented by 1. In Step 316, it is determined whether the parameter "i" is greater than or equal to the total number of blocks. When it is determined that the parameter "i" has not reached the total number of blocks, i.e., when the dequantization has not been completed for all of the blocks, the process goes back to Step 302, so that Steps 302 through 315 are executed regarding the next block.

When it is determined in Step 316 that the parameter "i" is greater than or equal to the total number of blocks, $E_{1uv}$ and $E_{2uv}$ have been obtained for all of the parameters "uv" and "v". Thus, an optimum quantization table is generated in Steps 317 through 323.

In step 317, the parameter "v" is set to 0, and in Step 318, the parameter "u" is set to 0. In Step 319, a quantization coefficient $Q'_{uv}$ is obtained according to the following equation:

$$Q'_{uv}=\text{round }(E_{1uv}/E_{2uv})$$

In Step 320, the parameter "u" is incremented by 1. In step 321, it is determined whether the parameter "u" is greater than or equal to 8. When the parameter "u" has not reached 8, the process goes back to Step 319, so that the quantization coefficient $Q'_{uv}$ is obtained for the next parameter "vu". When it is determined in Step 321 that the parameter "uv" is greater than or equal to 8, Step 322 is executed in which the parameter "v" is incremented by 1. In Step 323, it is determined whether the parameter "v" is greater than or equal to 8. When the parameter "v" has not reached 8, the process goes back to Step 318 so that the quantization coefficient Q'$_{uv}$ is obtained for the next parameter "v". When it is determined in Step 323 that the parameter "v" is greater than or equal to 8, the quantization coefficients Q'$_{uv}$ have been obtained for all of the parameters "u" and "v", therefore the optimum quantization table has been obtained, and thus, this program ends.

As described above, according to the third embodiment, the optimum quantization table is generated by taking into consideration only a case in which the quantized DCT coefficient r$_{iuv}$ is less than the boundary value, i.e., only a case in which the optimum quantization table is used in an expansion process. Therefore, an optimum quantization table, by which an image can be reproduced which is closer to the original image than when using the second embodiment, is obtained.

Note that, although, in each of the embodiments, the present invention is applied to a device which compresses image signals in accordance with the JPEG algorithm, the present invention can be applied to a device which compresses image signals in accordance with any other algorithm.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 8-247256 (filed on Aug. 29, 1996) which is expressly incorporated herein by reference, in its entirety.

I claim:

1. An image compression devices comprising:
   a quantization processor that quantizes image-processed data regarding one image, using a first quantization table composed of a plurality of first quantization coefficients, to obtain quantized image-processed coefficients;
   a quantization table generating processor that generates a second quantization table composed of a plurality of second quantization coefficients in such a manner that a difference between dequantized image-processed coefficients, obtained by dequantizing said quantized image-processed coefficients by using said second quantization table and said image-processed data for said one image is minimized;
   a compression processor that compresses said quantized image-processed coefficients to obtain compressed image data, said compression processor storing said compressed image data in a recording medium; and
   a quantization table storing processor that stores said first and second quantization tables in said recording medium.

2. A device according to claim 1, wherein said image-processed data compresing DCT coefficients obtained by performing a two-dimensional discrete cosine transformation on pixel data of an original image.

3. A device according to claim 1, further comprising an information storing processor that stores mode information indicating that said first and second quantization tables are stored in said recording medium.

4. A device according to claim 1, wherein said quantization table generating processor obtains said second quantization table in such a manner that a sum of a square of an error between said dequantized image-processed coefficients and said image-processed data becomes a minimum value.

5. An image expansion device by which compressed image data recorded in a recording medium, in which a first quantization table composed of a plurality of first quantization coefficients and a second quantization table composed of a plurality of second quantization coefficients are stored, is expanded, said device comprising:
   an expansion processor that expands said compressed image data read from said recording medium to reproduce quantized image-processed coefficients; and
   a dequantization processor that selects one of said first quantization table and said second quantization table in accordance with values of said quantized image-processed coefficients, said dequantization processor dequantizing said quantized image-processed coefficients, using a selected quantization table, to obtain dequantized image-processed coefficients, said second quantization table being generated such that a difference between said dequantized image-processed coefficients and the quantized image-processed coefficients is minimized.

6. A device according to claim 5, wherein said dequantization processor selects said second quantization table when each of said quantized image-processed coefficients is less than a boundary value, said dequantization processor selecting said first quantization table when each of said quantized image-processed coefficients is not less than said boundary value.

7. An image compression device in which input data corresponding to one image is divided into a plurality of blocks to compress said input data, said device comprising:
   a transformation processor that performs a two-dimensional discrete cosine transformation (two-dimensional DCT) to said input data to obtain DCT coefficients;
   a quantization processor that quantizes said DCT coefficients, using a first quantization table composed of a plurality of first quantization coefficients, to obtain quantized DCT coefficients;
   a quantization table generating processor that generates a second quantization table composed of a plurality of second quantization coefficients, such that a difference between dequantized DCT coefficients obtained by dequantizing said quantized DCT coefficients by using said second quantization table and said DCT coefficients for said one image is minimized;
   a compression processor that compresses said quantized DCT coefficients to obtain compressed image data, said compressing processor storing said compressed image data in a recording medium; and
   a quantization table storing processor that stores said first quantization table and said second quantization table in said recording medium.

8. A device according to claim 7, further comprising an information storing processor that stores mode information indicating that said first quantization table and said second quantization table are stored in said recording medium.

9. A device according to claim 7, wherein said quantization table generating processor obtains said second quantization table in such a manner that a sum of a square of an error between each of said dequantized DCT coefficients and each of said DCT coefficients in all of said blocks becomes a minimum value.

10. A device according to claim 7, wherein said quantization table generating processor obtains said second quantization coefficients, with respect to each of said blocks forming said one image, by taking account of only a case in which each of said quantized DCT coefficients is less than said boundary value.

11. An image expansion device by which compressed image data recorded in a recording medium, in which a first quantization table composed of a plurality of first quantization coefficients and a second quantization table composed of a plurality of second quantization coefficients are stored, is expanded, said device comprising:

an expansion processor that expands said compressed image data read from said recording medium to reproduce quantized DCT coefficients; and a dequantization processor that selects one of said first quantization table and said second quantization table in accordance with values of said quantized DCT coefficients, said dequantization processor dequantizing said quantized DCT coefficients, using said selected quantization table, to obtain dequantized DCT coefficients, said second quantization table being generated such that a difference between said dequantized DCT coefficients and said quantized DCT coefficients is minimized.

12. A device according to claim 11, wherein said dequantization processor selects said second quantization table when each of said quantized image-processed coefficients is less than a boundary value, and selects said first quantization table when each of said quantized image-processed coefficients is not less than said boundary value.

* * * * *